United States Patent
Bonne et al.

(10) Patent No.: US 6,502,459 B1
(45) Date of Patent: Jan. 7, 2003

(54) MICROSENSOR FOR MEASURING VELOCITY AND ANGULAR DIRECTION OF AN INCOMING AIR STREAM

(75) Inventors: Ulrich Bonne, Hopkins; David Kubisiak, Chanhassen; Ernie A. Satren, Bloomington; Steve R. Weeres, Minneapolis, all of MN (US)

(73) Assignee: Honeywell International Inc., Morristown, NJ (US)

( * ) Notice: Subject to any disclaimer, the term of this patent is extended or adjusted under 35 U.S.C. 154(b) by 35 days.

(21) Appl. No.: 09/653,399

(22) Filed: Sep. 1, 2000

(51) Int. Cl.$^7$ .............................. G01F 13/00; G01P 5/00
(52) U.S. Cl. ................................................. 73/170.11
(58) Field of Search .................. 73/170.01, 170.02, 73/170.07, 170.08, 204.11–204.26, 861.05, 861.95, 170.11, 170.12, 170.13, 170.14, 170.15

(56) References Cited

U.S. PATENT DOCUMENTS

| | | | |
|---|---|---|---|
| 3,015,232 A | 1/1962 | Schnoll | 73/204 |
| 3,335,606 A | 8/1967 | Scarpa | 73/204 |
| 3,783,356 A | 1/1974 | Lide, III et al. | 318/18 |

(List continued on next page.)

FOREIGN PATENT DOCUMENTS

| | | |
|---|---|---|
| DE | 2 934 566 A1 | 3/1981 |
| DE | 32 34 146 A1 | 3/1984 |
| DE | 42 22 458 A1 | 1/1994 |
| DE | 42 43 573 A1 | 6/1994 |
| DE | 296 07 315 U1 | 9/1996 |
| DE | 196 19 133 | 11/1997 |
| EP | 0 232 719 | 1/1987 |
| EP | 0 313 120 A | 4/1989 |
| EP | 0 348 245 A2 | 12/1989 |
| EP | 0 364 982 A2 | 4/1990 |
| EP | 0 419 873 A2 | 8/1990 |
| EP | 0 468 793 A2 | 1/1992 |
| EP | 0 702 212 | 3/1996 |
| EP | 0 773 432 A2 | 5/1997 |
| GB | 2 287 792 A | 9/1995 |
| JP | 56-153256 | 11/1981 |
| JP | 57-131029 | 8/1982 |
| JP | 57-206830 | 12/1982 |
| WO | WO 92/06369 | 4/1992 |
| WO | WO 94/20825 | 9/1994 |
| WO | WO 96/38731 | 12/1996 |
| WO | WO 98/36247 A | 8/1998 |

OTHER PUBLICATIONS

Dipl.–Ing. Dr. techn. Wolfgang Wehrmann et al., "Korrelationstechnik", Expert Verlag, Grafenau, XP002094984, 173 pages, 1980. (No Mo.).

S.R. Atalla et al. "Measurement of Thermal Properties of Liquids with an AC Heated–Wire Technique", International Journal of Thermophysics, vol. 2, No. 2, 1981. (No Mo).

Sobhy R. Atalla et al., "Radiation Effects with the AC Heated Strip Technique for the Measurement of Thermal Properties of Liquids", High Temperatures—High Pressures, vol. 17, pp. 447–452, 1985. (No Mo.).

Bonne et al., "Burstproof, Thermal Pressure Sensor for Gases", 1994 Solid State Sensor and Actuator Workshop, 2 pages. (No Mo.).

(List continued on next page.)

Primary Examiner—William Oen
(74) Attorney, Agent, or Firm—Crompton, Seager & Tufte

(57) ABSTRACT

A rugged microsensor assembly is disclosed that measures both the velocity and angular direction of an incoming air stream. The microsensor assembly includes at least two flow sensors, each orientated to measure a different velocity component of the incoming air stream. The velocity components are related by the geometry between the sensors, and the angular direction and velocity of the incoming air stream are determined by examining the measured velocity components. The preferred sensor is a fully passivated thermal differential microanemometer with back contacts, designed to operate in harsh environments.

52 Claims, 11 Drawing Sheets

U.S. PATENT DOCUMENTS

| | | | |
|---|---|---|---|
| 3,930,610 A | 1/1976 | Hache | 235/150.2 |
| 4,043,196 A | 8/1977 | Trageser | 73/204 |
| 4,228,815 A | 10/1980 | Juffa et al. | 137/10 |
| 4,230,290 A | 10/1980 | Townsend et al. | 244/1 R |
| 4,279,147 A | 7/1981 | Djorup | 73/189 |
| 4,478,076 A | 10/1984 | Bohrer | 73/204 |
| 4,478,077 A | 10/1984 | Bohrer et al. | 73/204 |
| 4,483,200 A | 11/1984 | Togawa et al. | 73/861.05 |
| 4,501,144 A | 2/1985 | Higashi et al. | 73/204 |
| 4,507,974 A | 4/1985 | Yelderman | 73/861.06 |
| 4,576,050 A | 3/1986 | Lambert | 73/861.05 |
| 4,651,564 A | 3/1987 | Johnson et al. | 73/204 |
| 4,672,846 A | 6/1987 | LeBlond et al. | 73/180 |
| 4,682,503 A | 7/1987 | Higashi et al. | 73/755 |
| 4,683,159 A | 7/1987 | Bohrer et al. | 428/138 |
| 4,713,970 A | 12/1987 | Lambert | 73/861.05 |
| 4,735,082 A | 4/1988 | Kolloff | 73/27 R |
| 4,790,181 A | 12/1988 | Aine | 73/204.8 |
| 4,909,078 A | 3/1990 | Sittler et al. | 73/204.26 |
| 4,944,035 A | 7/1990 | Aagardl et al. | 364/556 |
| 4,956,793 A | 9/1990 | Bonne et al. | 364/558 |
| 4,961,348 A | 10/1990 | Bonne | 73/861.02 |
| 5,031,126 A | 7/1991 | McCulloch et al. | 364/557 |
| 5,044,766 A | 9/1991 | Stuart | 374/43 |
| 5,050,429 A | 9/1991 | Nishimoto et al. | 73/204.26 |
| 5,056,047 A | 10/1991 | Sondergeld | 364/556 |
| 5,056,362 A | 10/1991 | Ang et al. | 73/204.26 |
| 5,085,576 A | 2/1992 | Bonne et al. | 431/22 |
| 5,146,414 A | 9/1992 | McKown et al. | 364/510 |
| 5,150,611 A | 9/1992 | Kleinhans | 73/204.14 |
| 5,184,509 A | 2/1993 | Kienzle et al. | 73/204.14 |
| 5,193,388 A | 3/1993 | Kleinhans | 73/204.14 |
| 5,220,830 A | 6/1993 | Bonne | 73/204.21 |
| 5,237,523 A | 8/1993 | Bonne et al. | 364/571.03 |
| 5,243,858 A | 9/1993 | Erskine et al. | 73/204.26 |
| 5,247,156 A | 9/1993 | Favre | 219/209 |
| 5,263,380 A | 11/1993 | Sultan et al. | 73/204.26 |
| 5,299,455 A | 4/1994 | Mangalam | 73/180 |
| 5,303,167 A | 4/1994 | Bonne | 364/556 |
| 5,310,449 A | 5/1994 | Henderson | 156/628 |
| 5,379,630 A | 1/1995 | Lacey | 73/25.03 |
| 5,463,899 A | 11/1995 | Zemel et al. | 73/195 |
| 5,511,428 A | 4/1996 | Goldberg et al. | 73/777 |
| 5,533,412 A | 7/1996 | Jerman et al. | 73/861.95 |
| 5,587,520 A | 12/1996 | Rhodes | 73/25.03 |
| 5,644,225 A | 7/1997 | Alfors et al. | 324/202 |
| 5,705,745 A | 1/1998 | Truetler et al. | 73/204.26 |
| 5,763,775 A | 6/1998 | Sato et al. | 73/204.26 |
| 6,019,505 A | 2/2000 | Bonne et al. | 374/40 |
| 6,169,965 B1 | 1/2001 | Kubisiak et al. | 702/136 |

OTHER PUBLICATIONS

Bonne et al., "Natural Gas Flow and Property Sensor", GRI Engine Technology Advisory Committee Meeting, May 1996, 5 pages.

Bonne, "Fully Compensated Flow Microsensor for Electronic Gas Metering", Intl. Gas Research Conference, Orlando, Florida, Nov. 16–19, 1992, Proceedings, vol. II, p. 859.

Bonne, "Microsensor Fabrication and Application", 11 IGT Symoposium on Gas Quality and Energy Measurement (Invited Paper), St. Petersburg, Florida, Feb. 2–4, 1998, Proceedings.

Bonne, New Developments in Natural Gas Transducer Technology, $8^{th}$ IGT Symposium on Gas Quality and Energy Measurement, Orlando, Florida, Feb. 1997.

Bonne, U. et al., "Thermal Microsensors for Environmental and Industrial Controls", NIST Workshop on "Gas Sensors: Strategy for Future Growth", Gaithersgurgh, Maryland, Sep. 8–9, 1993, NIST Special Publication No. 865, 1994, p. 31–38, ISSN: 1048–776X.

Bonne, U. et al., "Versatile Microbridge Flow Control Sensor Structure and Applications", SAE Technical Paper No. 921175, $22^{nd}$ Int'l Conf. Env. Syst., Seattle, Washington, Jul. 13–16, 1992.

Bonne, U., "Gas Composition Correction for Hot Element Flow Microsensors", $6^{th}$ IGT Symposium on "Natural Gas Quality Measurement", Chicago, Illlinois, Jun. 10–12, 1991, Figs. 2, 3, and 3a.

Carslaw et al., "Conduction of Heat in Solids", $2^{nd}$ Edition, Clarendon Press, Oxford, UK (1959), 7 pages. (No Mo.).

Frampton et al., "Gas Mass Flow Sensor Proof of Concept Testing for Space Shuttle Orbitor Flow Measurement", SAE Technical Paper No. 961335, Int'l. Conf. Env. Systems, Monteray, California, Jul. 1996.

Healy et al., "The Theory of the Transient Hot–Wire Method for Measuring Thermal Conductivity", Physics, 82C (1976) pp. 392–408. (No Date).

Higashi, R. E. et al, "Microstructure Sensors for Flow, Differential Pressure and Energy Measurement", $2^{nd}$ IGT Symposium on Pressure and Energy Measurement, Chicago, Illinois, Apr. 30–May 2, 1986, Proceedings.

Kim et al., "Thermocompression Bonding Effects on Bump–Pad Adhesion", IEEE Transactions on Components, Packaging, and Manufacturing Technology—Part B., vol. 18, No. 1, Feb. 1995.

Kubisiak et al, "Microamemometer–Based Gas Flow Sensing", IGT Symposium of Natural Gas Quality Measurement, Jul. 1990, 18 pages.

Kubisiak, D. et al., "Microanemometer–Based Flow Sensing", $5^{th}$ IGT Symposium on Natural Gas Quality Measurement, Chicago, Illinois, Jul. 16–18, 1990, Proceedings.

Lambert et al., "An air flow sensor based on interface thermal wave propagation", J. Appl. Phys., 59(1), Jan. 1986, 3 pages.

Mylroi, "Cross–Correlation Flow Measurement Systems", G.B., 12, No. 6–7, 1977, 4 pages. (No Date).

Ohnstein et al., "Environmentally Rugged Wide Dynamic Range Microstructure Airflow Sensor", IEEE Solid–State Sensor and Actuator Workshop, Hilton Head, South Carolina, Jun. 1990, Technical Digest, p. 158.

J. H. Hujising et al., "Developments in Integrated Smart Sensors", Transducers '93, Yokohama, Japan, Jun. 7–10, 1993, Proceedings, p. 320.

J. K. Zelisse et al., "Thermal Sigma–Delta Signal Modulator for Wind Speed and Direction Measurement" Eurosensors V, Rome, Italy, Sep. 30–Oct. 2, 1991, Proceedings, p. 303.

Bonne, Sensing Fuel Properties with Thermal Microsensors, SPIE Smart Electronics and MEMS Conference, San Diego, California, Feb. 25–29, 1996, Paper No. 2722–24, Proceedings, p. 165.

Protodyanakonow et al., "The Use of Probes in Investigating Two–Phase Flow", Fluid Mech., Soviet Res., 12, No. 3, (May–Jun. 1983), pp. 98–157.

U.S. patent application Ser. No. 09/002,157, filed Dec. 31, 1997, entitled "Time Lag Approach For Measuring Fluid Velocity".

U.S. patent application Ser. No. 09/001,735, filed Dec. 31, 1997, entitled "Self–Oscillating Fluid Sensor".

U.S. patent application Ser. No. 09/001,453, filed Dec. 31, 1997, entitled "Fluid Property and Flow Sensing Via a Common Frequency Generator and FFT".

U.S. patent application Ser. No. 09/207,165, filed Dec. 7, 1998, entitled "Rugged Fluid Flow and Property Microsensor".

U.S. patent application Ser. No. 09/482,441, filed Jan. 10, 2000, entitled "Self–Normalizing Flow Sensor and Method for the Same".

U.S. patent application Ser. No. 09/239,125, filed Jan. 28, 1999, entitled "Microsensor Housing".

U.S.Provisional patent application Ser. No. 60/137,464, filed Jun. 4, 1999, entitled "Self–Calibrating Flow Sensor".

Oudheusden Van B.W. et al., "High–sensitivity 2–D Flow Sensor with an Etched Thermal Isolation Structure," Elsevier Sequoia, vol. A21 –A23, (1990). No month.

PCT Notification of Transmittal of The International Search Report Or The Declaration, PCT/US01/27041, from the International Searching Authority, Apr. 10, 2002.

*(Prior Art)*

MICROSENSOR FOR MEASURING VELOCITY AND ANGULAR DIRECTION OF AN INCOMING AIR STREAM

CROSS REFERENCE TO CO-PENDING APPLICATIONS

This application is related to U.S. patent application Ser. No. 09/002,157, filed Dec. 31, 1997, entitled "Time Lag Approach For Measuring Fluid Velocity", U.S. patent application Ser. No. 09/001,735, filed Dec. 31, 1997, entitled "Self-Oscillating Fluid Sensor", U.S. patent application Ser. No. 09/001,453, filed Dec. 31, 1997, entitled "Fluid Property and Flow Sensing Via a Common Frequency Generator and FFT", and U.S. patent Application Serial No. 09/207.165, filed Dec. 7, 1998, entitled "Rugged Fluid Flow and Property Microsensor", all of which are assigned to the assignee of the present invention and incorporated herein by reference.

BACKGROUND OF THE INVENTION

The present invention generally relates to the measurement of properties of an incoming air stream, and more particularly, to the measurement of velocity and incident angle of an incoming air stream.

The measurement of the velocity and incident angle of an incoming air stream has many applications, including flight control applications, industrial process stream applications, combustion control, weather monitoring applications, etc. For flight control applications, the precise orientation or attitude of an aircraft relative to an incoming air stream, as well as the air velocity, are important components of the total "air data" information package used by modem flight control systems.

In most cases, air speed is detected by sensing the difference between head and static pressure, often using Pitot tubes. This approach operates well at speeds above about 60 knots if a very accurate differential pressure sensor or two absolute pressure sensors are used, at considerable expense. Additional sensors are typically needed to detect the orientation or attitude of an aircraft.

One way to detect the attitude of an aircraft is to use vane transducers, which include several mechanically rotating vanes that find an orientation that results in a balanced pressure or air speed on either side of the vanes. By detecting the resulting orientation of the vanes, the attitude of the aircraft can be determined. A limitation of such a sensor system is that the mechanical rotating vanes often reduce the reliability and response time of the sensor. In addition, most vane transducers have a relatively large radar cross-section, which is undesirable in many applications, such as military applications.

SUMMARY OF THE INVENTION

The present invention overcomes many of the disadvantages of the prior art by providing a rugged microsensor assembly that can measure both velocity and angular direction of an incoming air stream. The microsensor assembly preferably includes at least two flow sensors, each orientated to measure a different velocity component of the incoming air stream. The velocity components are related by the geometry between the sensors. The angular direction and velocity of the incoming air stream can be determined by examining the measured velocity components. Such a microsensor can provide a fast response time and a relatively small radar cross-section It is contemplated that the microsensor of the present invention may be used in a wide variety of applications, including for example, flight control applications, industrial applications, weather monitoring applications, etc.

In one illustrative embodiment of the present invention, the sensor assembly includes a first sensor and a second sensor. The first sensor measures the velocity component of the incoming air stream that extends along a first sensor axis. The second sensor measures the velocity component of the incoming air stream that extends along a second sensor axis, wherein the first sensor axis is rotated from the second sensor axis to intersect the second sensor axis at an intersection point.

From the outputs of the first and second sensors, the angular direction and velocity of the incoming air stream can be determined. During operation, if the angular direction of the air stream deviates in one direction, the velocity components of the incoming air stream that extend along the first sensor axis increase, and the velocity components of the incoming air stream that extend along the second sensor axis decrease. Likewise, if the angular direction of the air stream deviates in the other direction, the velocity components of the incoming air stream that extend along the first sensor axis decrease, and the velocity components of the incoming air stream that extend along the second sensor axis increase. By examining the velocity components measured by the first and second sensors, and using the relative geometry between the sensors, the angular direction of the air stream can be determined.

Preferably, both the first sensor and the second sensor are thin-film microanemometers such as available microbridge flow type sensors, each having at least one elongated heater element and at least one elongated sensor element, both in thermal communication with the incoming air stream. The elongated heater and sensor elements preferably extend perpendicular to the associated sensor axis. For example, the elongated heater and sensor elements of the first microbridge flow sensor preferably extend perpendicular to the first sensor axis, and the elongated heater and sensor elements of the second microbridge flow sensor preferably extend perpendicular to the second sensor axis.

The heater elements of the first and second microbridge flow sensors are then energized by either a common or separate heater energizers. The heater energizers preferably cause an elevated temperature condition in each of the elongated heater elements, which in turn, cause an elevated temperature condition in adjacent upstream and downstream sensor elements, and in the air stream. The temperature distribution near the thin-film bridge is transmitted symmetrical about the heater element when no air flow is present, and is disturbed when air flow is present. The amount of disturbance is related to the velocity of the air-stream along the corresponding sensor axis.

The sensor elements of the first and second microbridge flow sensors preferably have a resistance that changes with temperature. Accordingly, the sensor elements of the first microbridge flow sensor can be used to sense the temperature distribution provided by the heater element of the first microbridge flow sensor. Likewise, the sensor elements of the second microbridge flow sensor can be used to sense the temperature distribution provided by the heater element of the second microbridge flow sensor.

More specifically, and in one illustrative embodiment, one sensor element is positioned upstream from the heater element, and the other is positioned downstream. The heater element is then heated a predetermined amount above the ambient temperature of air-stream. When there is a positive air-stream, the upstream sensor element is cooled, and heat conduction from the heater element to the downstream sensor element is promoted. As a result, the temperature of the downstream sensor element is increased, and a difference in temperature between the sensor elements appears. This temperature difference can be related to the velocity component of the air-stream along the corresponding sensor axis.

Alternatively, and in another illustrative embodiment, the heater energizer provides a transient elevated temperature condition in each of the elongated heater elements, which in turn, causes a transient elevated temperature condition in the air stream. Each sensor element, which preferably has a resistance that changes with temperature, can be used to sense when the transient elevated temperature condition in the air stream arrives at the corresponding sensor element. The time lag between the transient elevated temperature condition in the heater element and the resulting transient elevated temperature condition in the sensor elements can be related to the velocity component of the air-stream along the corresponding sensor axis.

In this embodiment, each microbridge flow sensor may have a corresponding time lag detector for determining the time lag values. One time lag value may correspond to the time lag, or delay, between the transient elevated temperature condition in the heater element and the resulting transient elevated temperature condition in a first (e.g., upstream) sensor element. Another time lag value may correspond to the time lag between the transient elevated temperature condition in the heater element and the resulting transient elevated temperature condition in a second (e.g., downstream) sensor element.

The velocity component of the incoming air stream that extends along the first sensor axis can be determined using the two time lag values of the first microbridge flow sensor. Likewise, the velocity component of the incoming air stream that extends along the second sensor axis can then be determined using the two time lag values of the second microbridge flow sensor. Other illustrative methods and sensor configurations for determining the velocity component of the incoming air stream along the corresponding sensor axis are disclosed in U.S. Pat. Nos. 4,478,076, 4,478,077, 4,501,144, 4,651,564, 4,683,159, 5,050,429, U.S. patent application Ser. No. 09/002,157, filed Dec. 31, 1997, entitled "Time Lag Approach For Measuring Fluid Velocity", U.S. patent application Ser. No. 09/001,735, filed Dec. 31, 1997, entitled "Self-Oscillating Fluid Sensor", and U.S. patent application Ser. No. 09/001,453, filed Dec. 31, 1997, entitled "Fluid Property and Flow Sensing Via a Common Frequency Generator and FFT", all of which are assigned to the assignee of the present invention and incorporated herein by reference.

The heater energizers are preferably active circuits with feedback that provide whatever power or voltage is necessary to the heater elements to maintain a heater temperature that is a fixed amount above the ambient temperature of the incoming air-stream This helps maintain an adequate signal to noise ratio for each of the microbridge sensors.

To increase the reliability and accuracy of the sensor, the power or voltage that is applied to the heater elements may be monitored. The heater power or voltage can then be used to provide a redundant signal for air-stream velocity. As the velocity of the air-stream increases, the amount of power or voltage required to maintain the heater temperature at the fixed amount above the ambient temperature of the air-stream also increases. Thus, there is a relationship between the voltage or power applied to the heater, and the velocity of the air-stream. The relationship is relatively independent of the direction of the incoming air-stream. Once the velocity of the air-stream is determined using the power or voltage signal of the heater element, it can be compared to the velocity determined using the sensor elements. If there is a substantial difference, an error flag may be set.

In addition, the power or voltage that is supplied to each heater element can be used to detect a change in the heat transfer load of the heater elements. Such a change can be caused by, for example, the presence of rain, sleet, ice, dust, or any other foreign material or substance on the sensor. When the heat transfer load changes, it is contemplated that a flow rate correction factor can be computed to compensate for the change in the heat transfer load. Alternatively, the sensor apparatus can be disabled until the heat transfer load returns to an expected range.

To help improve the ruggedness and reduce the frailty of conventional microbridge flow sensors, it is contemplated that the thickness of the bridge and/or a protective coating may be applied to the bridge. The thickness of the bridge of a conventional microbridge flow sensor is often on the order of 1 micron. In order to ruggedize such a sensor, it is contemplated that the thickness of the bridge may be increased to 15 microns or more. In one embodiment, the thickness of the "bridge" is increased to about 10 microns. As the thickness of the "bridge" increases, both the frailty and the response time of the sensor decrease, the output signal decreases but the S/N (signal-to-noise) ratio stays substantially the same. Thus, there is a balance between the degree of ruggedness, response time and sensitivity of the sensor. In order to sense high mass flow fluids, without reaching the saturation signal of thermal anemometers, it is desirable to "desensitize" the flow sensor or effectively move the range of measurable flow velocities or mass fluxes to higher values.

Another approach for increasing the ruggedness as well as the ability to sense high mass flows of conventional microbridge flow sensors is to at least partially fill the cavity of a conventional microbridge flow sensor with a filler. The filler prevents the air-stream from flowing around both sides of the heater and sensor elements, and increases the thermal contact between the heater and sensor element, both of which reduce the sensitivity of the flow sensor. The filler also provides support to the bridge, and therefore leads to a more rugged structure than a conventional microbridge type sensor.

The filler preferably has a thermal coefficient of expansion that is substantially similar to the thermal coefficient of expansion of the material of the substrate (often silicon). The filler also preferably is a poor thermal conductor. In one embodiment, the filler is a UV curable epoxy. It is contemplated that the filler may assume a honeycomb, ribbed or embossed configuration, if desired.

Another approach for increasing the ruggedness and reducing the sensitivity of conventional microbridge flow sensors is to form the heater and sensor elements directly on a substrate (e.g. Pyrex glass). This eliminates the cavity and bridge of a conventional microbridge type sensor, and is referred to as a Microbrick™ type flow sensor. Because the incoming air-stream does not flow around both sides of the heater and sensor elements, the sensitivity is reduced. Also, because the backsides of both the heater and sensor elements are supported by the substrate, the sensor is more rugged than a conventional microbridge type sensor.

Finally, it is contemplated that the thin contact wires used to connect the elements of a conventional microbridge flow sensor to off-chip components may be replaced with Through-The-Wafer (TTW) contacts. This increases the reliability of sensor because no fragile and electrically conductive wires or pads need to be exposed to possibly conductive fluid contaminates or fluid flow shear forces.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE INVENTION

The present invention, then, is directed to a microsensor system that can measure the velocity and/or angular direction of an incoming air stream. The microsensor system provides a fast response time and a relatively small radar cross-section It is contemplated that the microsensor system of the present invention may be used in a wide variety of applications, including for example, flight control applications, industrial applications, weather monitoring applications, etc. The preferred embodiments of the present invention contemplate disposing at least two sensors in the incoming air-stream. The first sensor measures the velocity component of the incoming air stream along a first sensor axis, and the second sensor measures the velocity component of the incoming air stream along a second sensor axis. From the outputs of the first and second sensors, the angular direction and velocity of the incoming air stream can be determined.

The first and second sensors are preferably microsensors that have microscopic sized heater and sensor serpentine strips. Such microsensors or "microbridges", as they will be referred to herein, though not limiting, are presently preferred because they are fast-reacting, accurate, small, and adaptable to a variety of configurations.

Microbridge Sensors

The microbridge semiconductor chip sensor contemplated, for example, in certain embodiments preferred for the invention may resemble the form of one or more of the microbridge systems illustrated in U.S. Pat. Nos. 4,478,076, 4,478,077, 4,501,144, 4,651,564, 4,683,159, 4,994,035, and 5,050,429, all of common assignee with the present invention.

Figure 1:
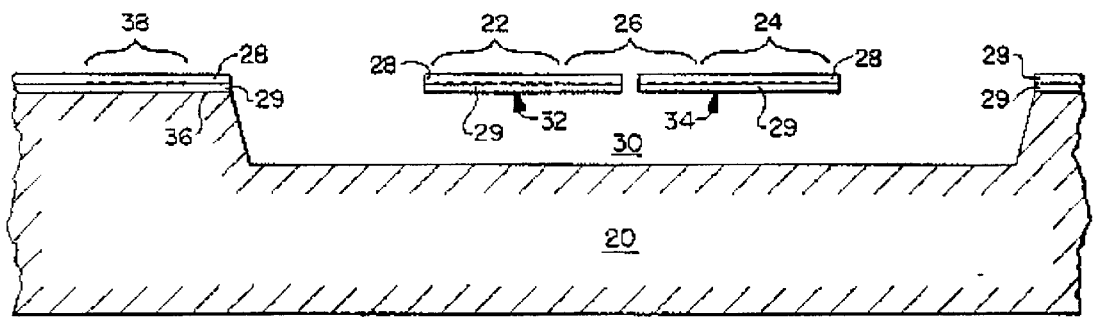
FIGS. 1 and 2 are different views of a prior art embodiment of a microbridge flow sensor.
Figure 2:
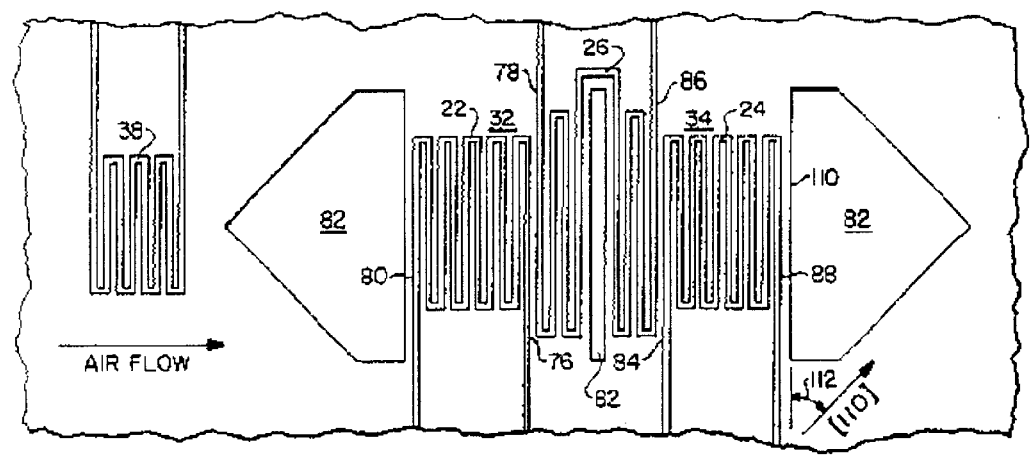

Such a system is exemplified by FIGS. 1–2 taken from U.S. Pat. No. 4,994,035 to Aagard et al. A discussion of that example will now be presented as it will be helpful in understanding the present invention. While the present discussion is believed sufficient, to the extent necessary, any additional material contained in the microbridge related patents cited is deemed to be incorporated herein by reference.

The prior art system of FIGS. 1–2 contemplates a pair of thin film temperature sensors 22 and 24, a thin film heater 26 and a support member 20 supporting the sensors and heater out of contact with the base substrate. Sensors 22 and 24 are disposed on opposite sides of heater 26. Support member 20 is a semiconductor, preferably silicon, chosen because of its adaptability to precision etching techniques and ease of electronic chip producibility. The embodiment includes two identical thin-film temperature sensing resistor serpentines 22 and 24 acting as temperature sensors and a centrally located thin-film heater resistor serpentine 26 acting as a heater.

Sensors 22 and 24 and heater 26 may be fabricated of any suitable, stable metal or alloy film. The metal used may be platinum or a nickel-iron alloy sometimes referred to as permalloy, with a composition of 80 percent nickel and 20 percent iron. The sensor and heater serpentines are encapsulated in a thin film of dielectric, typically comprising layers 28 and 29 and preferably silicon nitride, $Si_3N_4$ to form the film members.

In FIGS. 1 and 2, the sensor comprises two thin film members 32 and 34, with member 32 comprising sensor 22 and member 34 comprising sensor 24, each member comprising one-half of heater 26 and having a preferred dimension of 150 microns wide and 400 microns long.

The system further describes an accurately defined fluid space or cavity 30 that effectively surrounds elements 22, 24 and 26, and is achieved by fabricating the structure on silicon surface 36. For the prior art structures shown, thin film elements 22, 24 and 26 have thickness' of approximately 0.05 to 0.12 micron with line widths on the order to 5 microns and spaces between lines on the order of 5 microns. The elements with the silicon nitride film encapsulation have a total thickness of approximately 0.8 microns or less. The fluid space 30 may be fabricated by subsequently etching an accurately defined fluid space of about 100 microns deep into silicon body or substrate 20 beneath members 32 and 34.

Members 32 and 34 connect to top surface 36 of semiconductor body 20 at one or more edges of cavity or fluid space 30. Members 32 and 34 may be bridged across cavity 30; alternately, for example, members 32 and 34 could be cantilevered over cavity 30.

In the system shown in FIGS. 1–2, heat flows from the heater to the sensor by means of both solid and fluid couplings therebetween. Of note is the fact that silicon nitride ($Si_3N_4$), besides being a good electrical insulator, is also an effective solid thermal insulator. Because the connecting silicon nitride film within members 32 and 34 is a good insulator, heat transmission through the solid does not dominate the propagation of heat from heater 26. This further enhances the relative amount of the heat conducted to sensing resistors 22 and 24 from heater resistor 26 by flow through the surrounding fluid rather than through the supporting nitride film. Moreover, the supporting silicon nitride film has a low enough thermal conductivity that sensing resistor serpentines 22 and 24 can be located immediately adjacent or juxtaposed to heating resistor serpentine 26. Thus, sensing resistor serpentines 22 and 24 are in effect suspended rigidly in the fluid space proximate heater resistor 26 and act as thermal probes to measure the temperature of the air near and in the plane of heater resistor serpentine 26.

Figure 3:
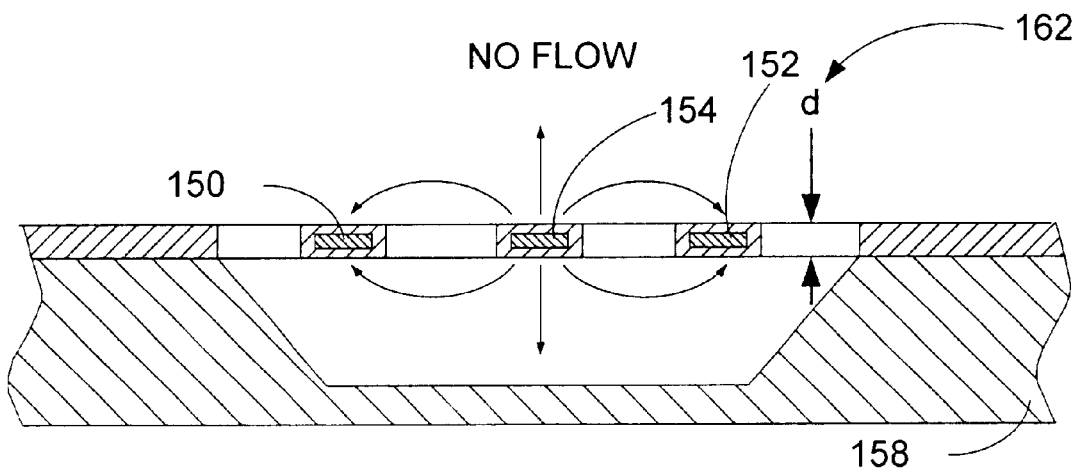
FIG. 3 shows a schematic cross-sectional view of the microbridge sensor of FIGS. 1–2, with no air flow passing over the sensor.

FIG. 3 shows a schematic cross-sectional view of the microbridge sensor of FIGS. 1–2, with no air flow passing over the sensor. Like above, a heater serpentine 154, a first sensor serpentine 150 and a second sensor serpentine 152 are suspended above substrate 158 across a bridge. For simplicity, the heater serpentine 154, the first sensor serpentine 150 and the second sensor serpentine 152 are all shown as single elongated strips. However, it is contemplated that each of these elements may be configured as a grid or serpentine.

Figure 4:
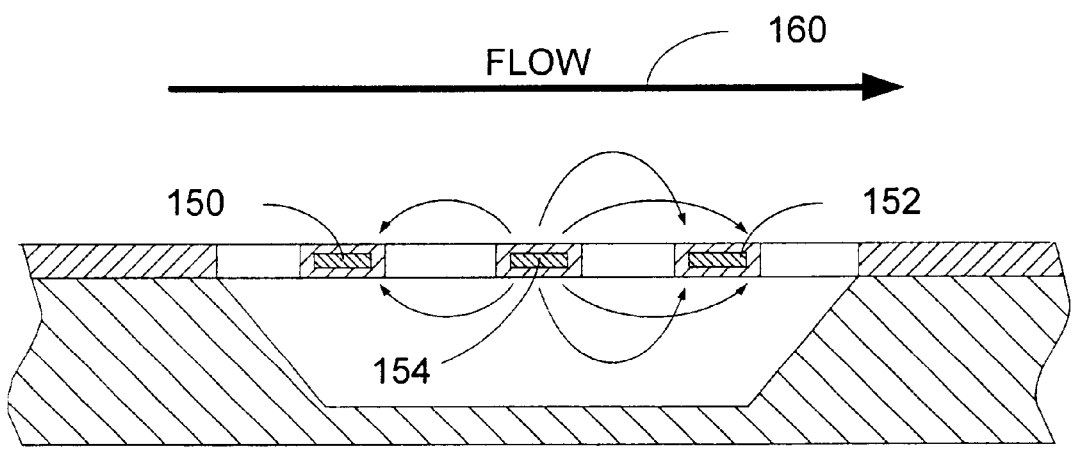
FIG. 4 shows a schematic cross-sectional view of the microbridge sensor of FIGS. 1–2, with a positive air flow passing over the sensor.

As can be seen, there is no air flow in FIG. 3. Thus, when the heater element 154 is heated to a temperature higher than the ambient temperature, the temperature distribution near the thin-film bridge portion is transmitted symmetrical about the heater element 154. As shown in FIG. 4, however, when an air-stream 160 is present, the symmetrical distribution is disturbed, as illustrated by the shown arrows. The amount of disturbance is related to the velocity of the air-stream 160.

In one illustrative embodiment, the velocity of the air-stream 160 is determined by heating the heater element 154 a predetermined amount above the ambient temperature of air-stream 160. When there is an air-stream 160 present, the upstream sensor element 150 is cooled, and heat conduction from the heater element 154 to the downstream sensor element 152 is promoted. As a result, a temperature difference between the upstream and downstream sensor elements 150 and 152 appears. This temperature difference can be related to the velocity component of the air-stream 160 along the sensor axis. A further discussion of such a method can be found in U.S. Pat. No. 4,478,077 to Bohrer et al., which is incorporated herein by reference.

In another illustrative embodiment, the velocity of the air-stream 160 along the sensor axis is determined by providing a transient elevated temperature condition in the heater element 154, which in turn, causes a transient elevated temperature condition in the air-stream 160. When there is a non-zero air-stream 160, the upstream sensor element 150 receives a transient response later than the downstream side sensor 152. The velocity of the air-stream 160 along the sensor axis can then be computed using the respective time lag values.

Other illustrative methods and sensor configurations for determining the velocity component of the incoming air stream along a primary sensor axis are disclosed in, for example, U.S. Pat. Nos. 4,478,076, 4,478,077, 4,501,144, 4,651,564, 4,683,159, 5,050,429, U.S. patent application Ser. No. 09/002,157, filed Dec. 31, 1997, entitled "Time Lag Approach For Measuring Fluid Velocity", U.S. patent application Ser. No. 09/001,73, filed Dec. 31, 1997, entitled "Self-Oscillating Fluid Sensor", and U.S. patent application Ser. No. 09/001,453, filed Dec. 31, 1997, entitled "Fluid Property and Flow Sensing Via a Common Frequency Generator and FFT", all of which are assigned to the assignee of the present invention and incorporated herein by reference.

Angular Direction and Velocity Determination

The present invention provides a rugged microsensor assembly that can measure both the angular direction and velocity of an incoming air stream. The microsensor is able to provide a fast response time and a relatively small radar cross-section In one illustrative embodiment of the present invention, the sensor assembly includes a first sensor and a second sensor. The first sensor measures the velocity component of the incoming air stream that extends along a first sensor axis. The second sensor measures the velocity component of the incoming air stream that extends along a second sensor axis, wherein the first sensor axis intersects the second sensor axis at a point. The velocity components are related by the geometry between the sensors. Thus, by examining the measured velocity components, the angular direction of the air stream can be determined.

Figure 5:
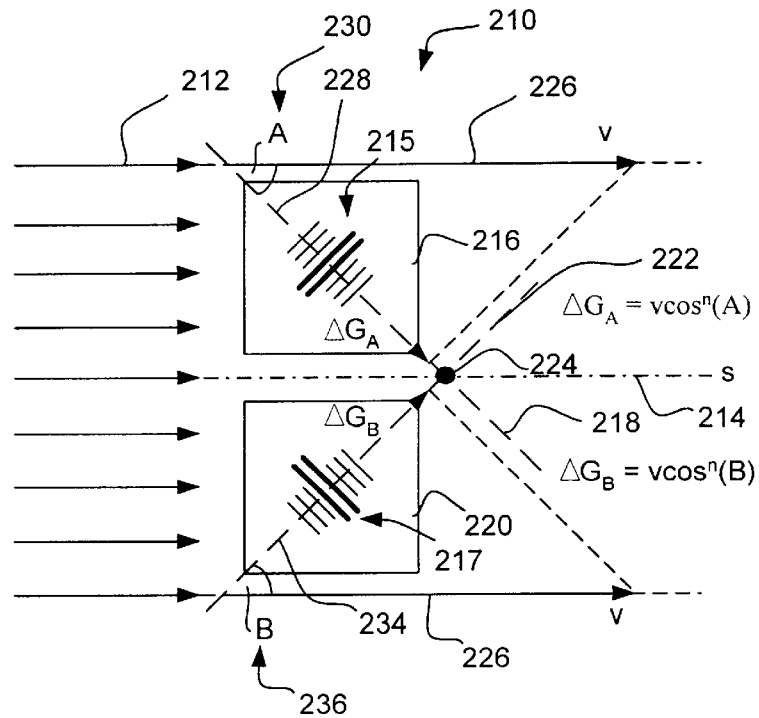
FIG. 5 is a schematic diagram of an illustrative sensor assembly of the present invention with the angular direction of the incoming air-stream substantially parallel to the axis of symmetry.
Figure 6:
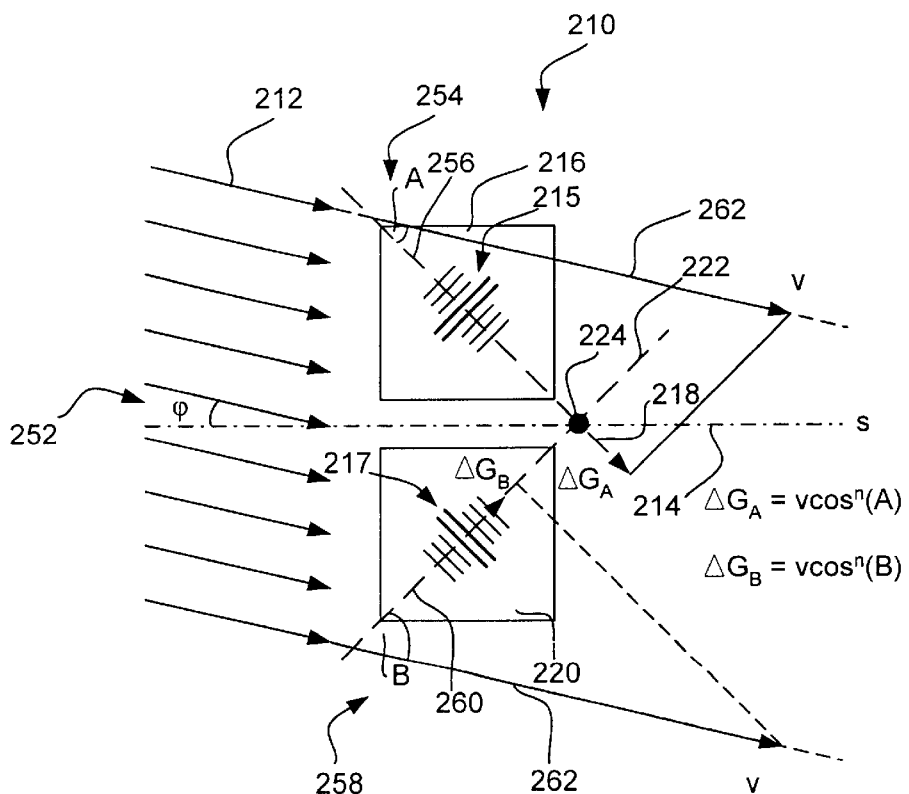
FIG. 6 is a schematic diagram of the same sensor assembly of FIG. 5 with the angular direction of the incoming air-stream offset from the axis of symmetry.

FIGS. 5–6 show a schematic diagram of an illustrative sensor assembly 210 for measuring the angular direction ψ and velocity of an incoming air-stream. FIG. 5 shows the sensor assembly 210 with the angular direction ψ of the incoming air-stream 212 substantially parallel to the axis of symmetry 214 of the sensor assembly 210, and FIG. 6 shows the same sensor assembly 210 with the angular direction ψ 252 of the incoming air-stream 212 offset relative to the axis of symmetry 214.

The illustrative sensor assembly 210 includes a first sensor 216 and a second sensor 220. The first sensor 216 and the second sensor 220 may be microbridge type flow sensors, each having at least one elongated heater serpentine and at least one elongated sensor serpentine in thermal communication with the incoming air stream 212. The elongated heater and elongated sensor serpentines 215 of the first sensor 216 preferably extend perpendicular to the first sensor axis 218, and the elongated heater and elongated sensor serpentines 217 of the second sensor 220 preferably extend perpendicular to the second sensor axis 222, as shown.

The first sensor 216 and the second sensor 220 are preferably positioned such that the first sensor axis 218 intersects the second sensor axis 222 at a point 224. In the illustrative embodiment, the first sensor 216 and the second sensor 220 are positioned such that the first sensor axis 218 and the second sensor axis 222 intersect at an angle of about 90 degrees. The first sensor 216 and the second sensor 220 are also preferably positioned symmetrically about the axis of symmetry 214 of the sensor assembly 210.

In FIG. 5, the incoming air-stream 212 is shown flowing substantially parallel to the axis of symmetry 214 of the sensor assembly 210. This corresponds to an air-stream 212 that has an angular direction ψ 252 of zero degrees (at least in the example shown). A velocity vector representing the velocity of the incoming air-stream 212 is shown at 226, and in FIG. 5, extends substantially parallel to the axis of symmetry 214.

The first sensor 216 is positioned such that the first sensor axis 218 is offset 45 degrees from the axis of symmetry 214. Thus, the angle "A" 230 between the velocity vector 226 of the air-stream 212 and the first sensor axis 218 is 45 degrees. Likewise, the second sensor 220 is positioned such that the second sensor axis 222 is offset 45 degrees from the axis of symmetry 214, and intersects the first sensor axis 218 at point 224. Thus, the angle "B" 236 between the velocity vector 226 of the air-stream 212 and the second sensor axis 222 is also 45 degrees.

In FIG. 6, the incoming air-stream 212 is shown flowing at an angular direction ψ 252 relative to the axis of symmetry 214 of the sensor assembly 210. The velocity vector representing the velocity of the incoming air-stream 212 is now shown at 262. Like in FIG. 5, the first sensor 216 is positioned such that the first sensor axis 618 is offset by 45 degrees from the axis of symmetry 214. Thus, angle "A" 254 between the velocity vector 262 of the air-stream 212 and the first sensor axis 218 is smaller than the angle "A" 230 of FIG. 5. Likewise, the second sensor 220 is positioned such that the second sensor axis 222 is offset 45 degrees from the axis of symmetry 214, and intersects the first sensor axis 218 at point 224. Thus, angle "B" 258 between the velocity vector 262 of the air-stream 212 and the second sensor axis 222 is larger than the angle "B" 236 of FIG. 5. In both cases, however, angle "A" plus angle "B" remains equal to 90 degrees.

In this configuration, the first sensor 216 measures the velocity component of the incoming air stream 212 that extends along the first sensor axis 218. The second sensor 220 measures the velocity component of the incoming air stream 212 that extends along the second sensor axis 222. The first sensor output signal, $\Delta G_A$, of the first microbridge sensor 216 can be expressed as:

$$\Delta G_A = v \cos^n(A) \qquad (1)$$

where $\Delta G_A$ represents the change in the sensor output signal relative to the sensor output signal that exists when the air-steam 212 has an angular direction ψ 252 of zero degrees (i.e., is parallel to the axis of symmetry 214); "v" is the velocity vector of the incoming air stream 212, "A" is the angle between the velocity vector of the air-stream 212 and the first sensor axis 218, and "n" is a curve fit factor. Equation (1) can be derived from the relative geometry of the sensors shown in FIGS. 5–6. For the sake of clarity, a calibration factor "a" in $\Delta G_A = a \Delta G'_A$ has been omitted, where $\Delta G'_A$ represents the raw sensor output signal. As can be seen, the first sensor output signal, $\Delta G_A$, is related to the velocity component of the velocity vector of the incoming air stream 212 that extends along the first sensor axis 618 by a cosine function.

The second sensor output signal, $\Delta G_B$, of the second sensor 220 can be likewise expressed as:

$$\Delta G_B = v \cos^n(B) \qquad (2)$$

As indicated above, angle "A" plus angle "B" equals 90 degrees regardless of the angular direction ψ 252 of the incoming air stream 212 (at least for $-45 \leq \psi \leq 45$). When A+B=90, we know that:

$$\cos^2(A) + \cos^2(B) = 1 \qquad (3)$$

Combining Equations (1)–(3), and solving for the velocity vector and angles "A" and "B", we get:

$$v = \left[ \frac{(\Delta G_A^{2/n} + \Delta G_B^{2/n})}{2} \right]^{n/2} \qquad (4)$$

$$A = \arccos\left[ \left( \frac{G_A}{v} \right)^{1/n} \right] \qquad (5)$$

$$B = 90 - A \qquad (6)$$

From this, the angular direction ψ 252 of the incoming air stream 212 can be calculated using the relation:

$$\varphi = \frac{A - B}{2} \qquad (7)$$

The above equations are valid when the first sensor axis 218 of the first sensor 216 and the second sensor axis 222 of the second sensor are orthogonal (i.e. intersect at 90 degrees). However, in some cases, for example, in order to maximize the S/N ration for a given range of direction angle ψ, it may be desirable to have the angle between the first sensor axis 218 and the second sensor axis 222 less than 90 degrees.

Figure 7:
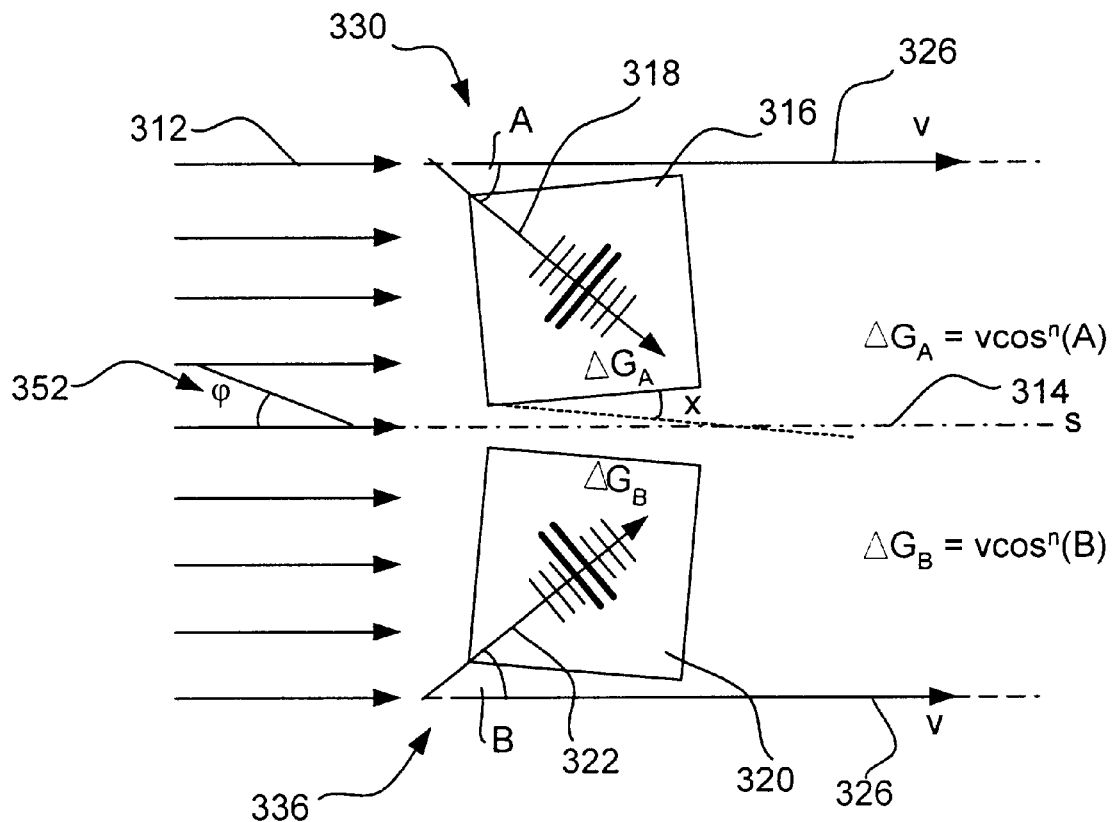
FIG. 7 is a schematic diagram of a preferred sensor assembly of the present invention with the sensor axes of the first and second sensors in a non-orthogonal configuration.

FIG. 7 is a schematic diagram of a preferred sensor assembly of the present invention where the first sensor 318 is rotated relative to the axis of symmetry 314+R degrees, and the second sensor 320 is rotated relative to the axis of symmetry 314–R degrees. Accordingly, the first sensor 318 is offset from the second sensor 320 by "X" degrees, where X=2R. In this configuration, the first sensor 318 is positioned such that the first sensor axis 322 is offset 45–R degrees from the axis of symmetry 314, and the angle "A" 330 between the velocity vector 326 of the air-stream 312 and the first sensor axis 318 is 45+R degrees. Likewise, the second sensor 320 is positioned such that the second sensor axis 322 is offset 45–R degrees from the axis of symmetry 314, and the angle "B" 336 between the velocity vector 326 of the air-stream 312 and the second sensor axis 322 is 45+R degrees.

To identify the angular direction ψ 352 of the air-stream 312, the set of equations (1)–(7) can be solved with A+B+X=90. This provides a more general solution for determining velocity and angular direction ψ 352 of the incoming air stream 312. A proximate solution without iterations is provided by:

$$v = \{\Delta G_A^2 + \Delta G_B^2 - 1.5\Delta G_A \Delta G_B \cos(90+X)\}^{n/2} \qquad (8)$$

For increasing values of X, the values for $\Delta G_A$ and $\Delta G_B$ increase, at least when the air-stream 312 has an angular direction ψ 352 of ±20 degrees. This may result in higher S/N ratios and may reduce the influence of sensor offsets. It also may reduce the directional sensitivity, particularly for values of X greater than about 25 degrees. The relative orientation of the sensors, and thus the value of X, is preferably optimized for the desired application. In a preferred embodiment, the sensors are orientated so that X is about 20 degrees.

Figure 8:
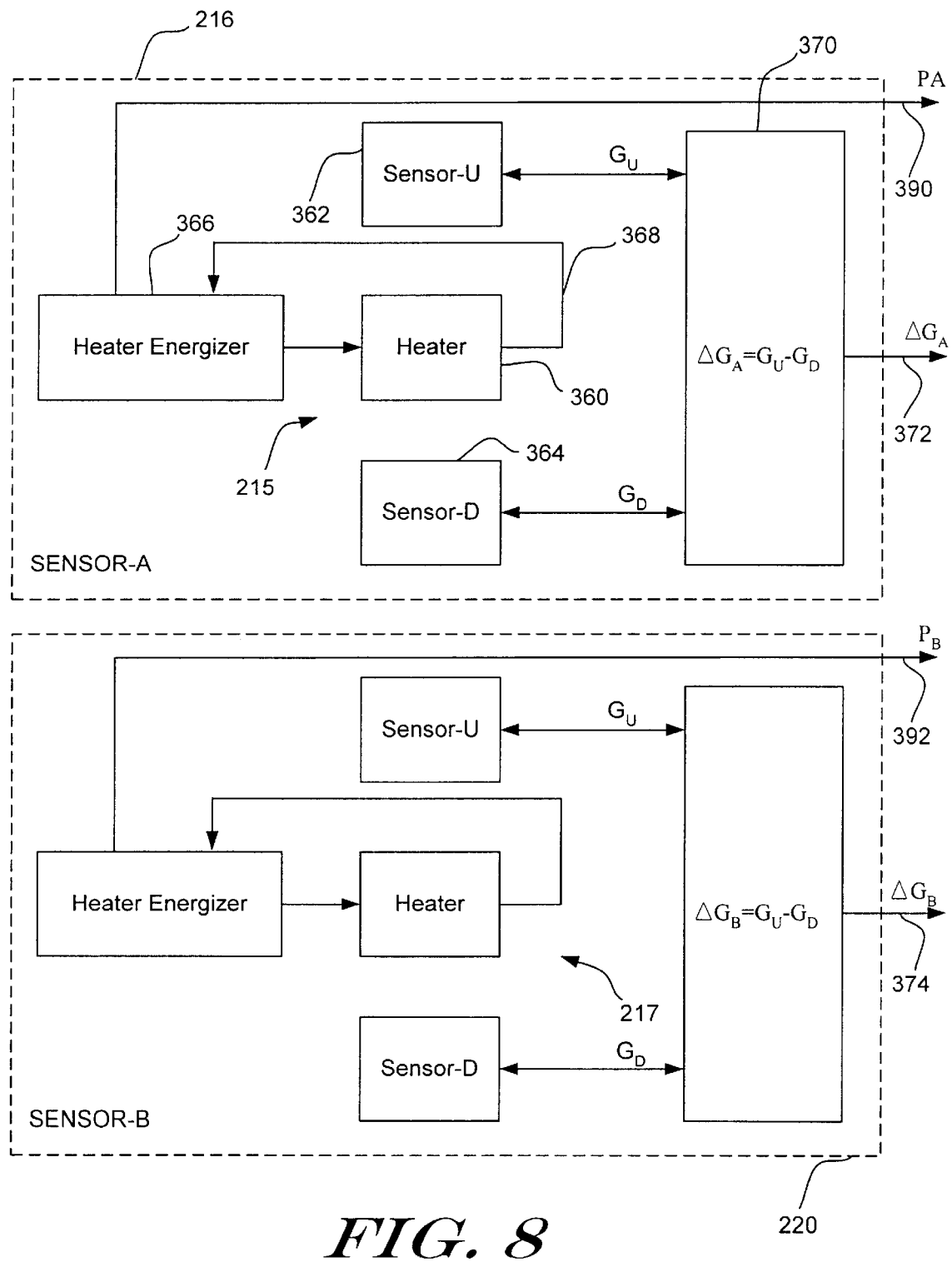
FIG. 8 is a block diagram of the first sensor assembly and second sensor assembly of FIG. 5.

FIG. 8 is a block diagram of the first sensor assembly 216 and second sensor assembly 220 of FIG. 5. The first sensor assembly 216 includes one or more heater and sensor elements, as generally shown at 215. In the illustrative embodiment, the first sensor assembly 216 includes a centrally located heater element 360 surrounded by an upstream sensor 362 and a downstream sensor 364.

The velocity of the air-stream is determined by heating the heater element 360 with heater energizer 366 a predetermined amount above the ambient temperature of air-stream. In the illustrative embodiment, the heater energizer 366 includes a feedback loop 368 for monitoring the resistance, and thus the temperature of the heater element 368. When an air-stream is present, the upstream sensor element 362 is cooled, and the downstream sensor element 364 is heated. As a result, a temperature difference between the upstream and downstream sensor elements 362 and 364 appears. An electronic circuit 370 determines the resistance, and thus the temperature, of both the upstream and downstream sensor elements 362 and 364, and provides the difference as an output signal 372. The second sensor assembly 220 operates in a similar manner, providing a difference signal 374.

Figure 9:
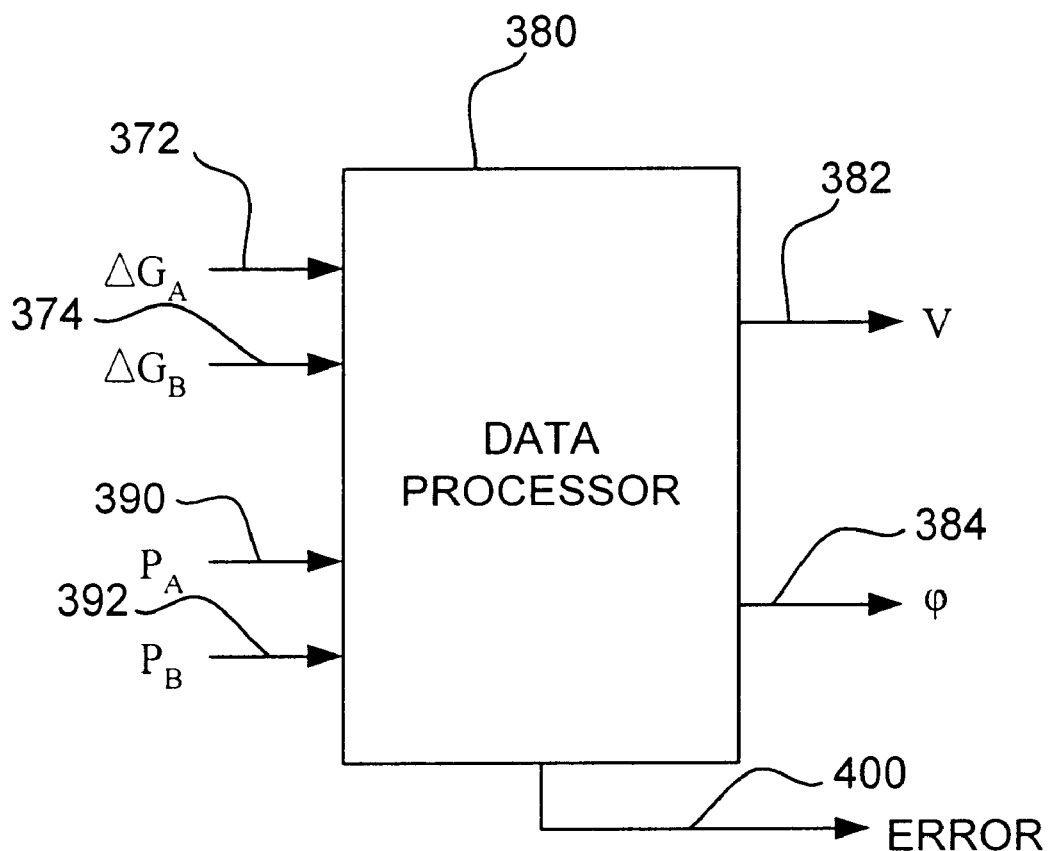
FIG. 9 is a block diagram of a data processing block for processing the signals provided by the first sensor assembly and second sensor assembly of FIG. 8.

FIG. 9 is a block diagram of a data processing block for processing the difference signals 372 and 374 provided by the first sensor assembly 216 and second sensor assembly 220 of FIG. 8. The data processing block 380 receives the difference signals 372 and 374, and calculates both the velocity 382 and angular direction 384 of the incoming air-stream, preferably using the Equations (4)–(8) as appropriate.

Referring back to FIG. 8, the heater energizer of the first and second sensor assemblies 216 and 220 are preferably active circuits with feedback, and provide whatever power (or voltage) is necessary to the heater elements to maintain a heater temperature that is a fixed amount above the ambient temperature of the incoming air-stream. This has a number of advantages including helping to maintain an adequate signal to noise ratio for each of the sensors.

To increase the reliability and accuracy of the sensor, the power (or voltage) that is applied to the heater elements may be monitored. In the embodiment shown, the heater energizer 366 of the first sensor assembly 216 provides a power signal 390 that indicates the power that is currently required to maintain the temperature of the heater element 360 at the desired heater temperature level. The second sensor assembly 220 likewise may also provide a power signal 392.

In FIG. 9, the data processing block may receive the power signals 390 and 392, and calculate a redundant signal for air-stream velocity. As the velocity of the air-stream increases, the amount of power or voltage required to maintain the desired heater temperature level also increases. Thus, there is a relationship between the power (or voltage) applied to the heater elements, and the velocity of the air-stream. The relationship is relatively independent of the direction of the incoming air-stream. It is contemplated that the velocity of the air-stream can be determined using the power (or voltage) signals 390 and/or 392, and compared to the velocity determined using the difference signals 372 and 274 from the sensor elements. If there is a substantial difference, an error flag 400 may be set.

In addition, the power (or voltage) signals 390 and/or 392 may be used to detect a change in the heat transfer load of the heater elements 360. Such a change can be caused by, for example, the presence of rain, sleet, ice, dust, or any other foreign material or substance on the sensor. When the heat transfer load changes, it is contemplated that a flow rate correction factor can be computed to compensate for the change in the heat transfer load. Alternatively, the sensor apparatus can be disabled until the heat transfer load returns to an expected range.

Alternatively, and in another illustrative embodiment, the heater energizer 366 of FIG. 8 may provide a transient elevated temperature condition in the heater element 360, which in turn causes a transient elevated temperature condition in the air stream. Each sensor element 362 and 364 can be used to sense when the transient elevated temperature condition in the air stream arrives at the corresponding sensor element. The time lag between the transient elevated temperature condition in the heater element and the resulting transient elevated temperature condition in the sensor elements can be related to the velocity component of the air-stream along the corresponding sensor axis.

In this embodiment, each microbridge flow sensor may have a corresponding time lag controller 370 for determining the time lag values. One time lag value may correspond to the time lag, or delay, between the transient elevated temperature condition in the heater element 360 and the resulting transient elevated temperature condition in the upstream sensor element 362. Another time lag value may correspond to the time lag between the transient elevated temperature condition in the heater element 360 and the resulting transient elevated temperature condition in the downstream sensor element 364.

The velocity component of the incoming air stream that extends along the first sensor axis can be determined using the two time lag values of the first microbridge flow sensor. Likewise, the velocity component of the incoming air stream that extends along the second sensor axis can then be determined using the two time lag values of the second microbridge flow sensor. Other illustrative methods and sensor configurations for determining the velocity component of the incoming air stream along the corresponding sensor axis are disclosed in U.S. Pat. Nos. 4,478,076, 4,478,077, 4,501,144, 4,651,564, 4,683,159, 5,050,429, U.S. patent application Ser. No. 09/002,157, filed Dec. 31, 1997, entitled "Time Lag Approach For Measuring Fluid Velocity", U.S. patent application Ser. No. 09/001,735, filed Dec. 31, 1997, entitled "Self-Oscillating Fluid Sensor", and U.S. patent application Ser. No. 09/001,453, filed Dec. 31, 1997, entitled "Fluid Property and Flow Sensing Via a Common Frequency Generator and FFT", all of which are assigned to the assignee of the present invention and incorporated herein by reference.

Regardless of the method used for determining the velocity components along the sensor axes, it is contemplated that the sensors may be periodically zeroed out to reduce drift and offsets in the supporting electronics. This may be accomplished by, for example, periodically recording the sensor outputs when zero heater input power is provided. These sensor outputs may be used to identify a new "zero" point for the sensors.

Figure 10:
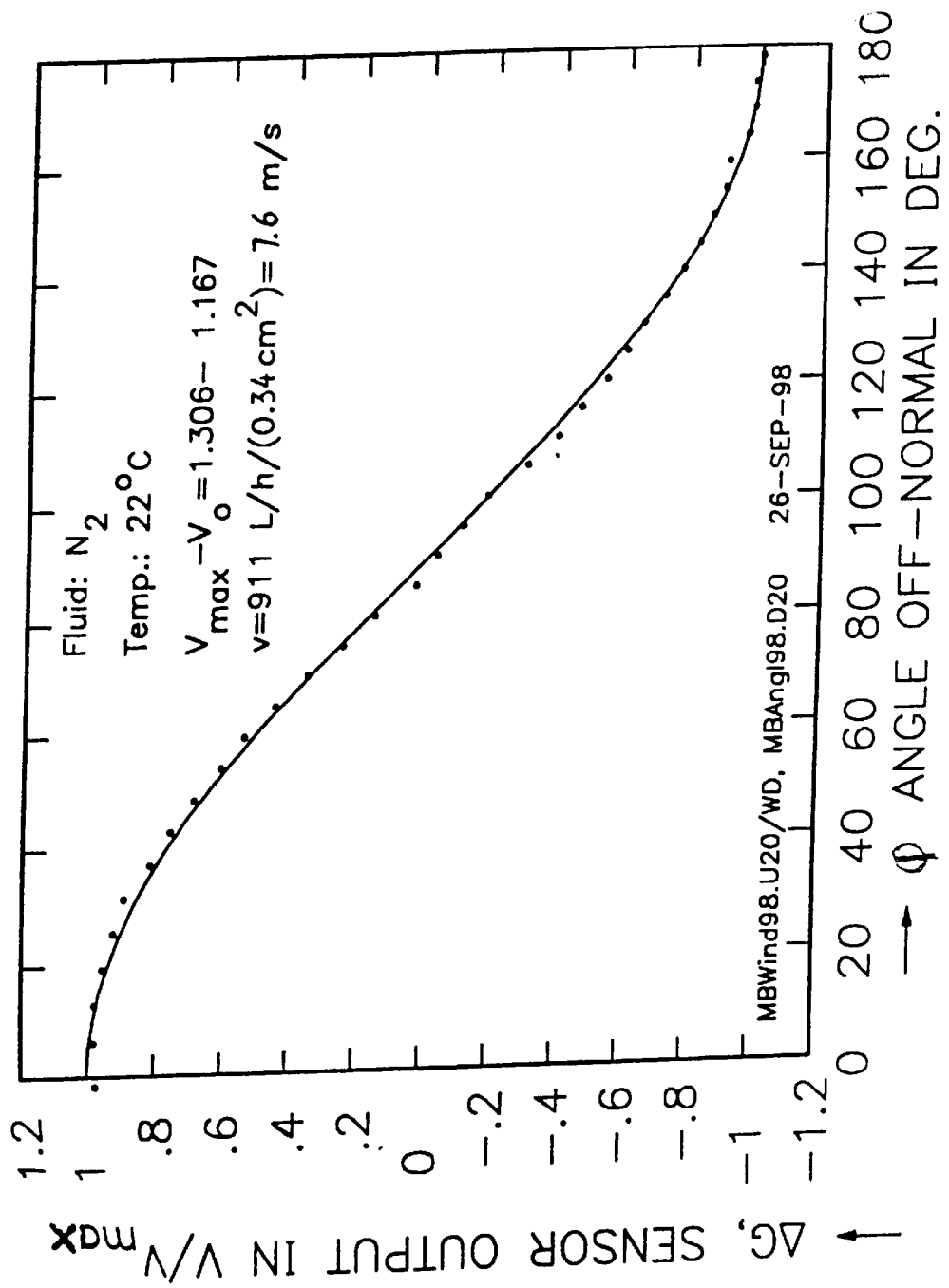
FIG. 10 is a graph showing the measured velocity component of the incoming air stream, $\Delta G_A$, versus the angular off-normal direction $\psi$ of the air-stream.

FIG. 10 is a graph showing the measured velocity component of the incoming air stream, $\Delta G_A$, versus the angular off-normal direction $\psi$ 252 of the air-stream As can be seen, the measured velocity component of the incoming air stream, $\Delta G_A$, is related to the angular off-normal direction $\psi$ 252 of the air-stream by a cosine function, as expressed in Equations (1) and (2) above.

Conventional microbridge flow sensors have a substrate and a bridge, where the bridge extends over a cavity formed in the substrate. The bridge typically carries the heater and sensor elements, as described above. The sensitivity of conventional microbridge flow type sensors typically accommodates flows in the 0.01 to 30 m/s (0.02 to 60 knots)

range. For some applications, however, such as flight control applications, the sensitivity of the microbridge flow type sensors must accommodate flows up to the 600 m/s (1200 knots) range. Accordingly, for some applications, the sensitivity of the microbridge flow sensor must be reduced, or its upper flow limit must be extended, sometimes by 120× or more. In addition, many conventional microbridge flow type sensors are not rugged enough to withstand severe environments. For example, for many flight control environments, the microbridge flow type sensor must often withstand environments that include heavy winds, hail, rain, etc.

One way to help improve the ruggedness and reduce the sensitivity of conventional microbridge flow sensors it to increase the thickness "d" 162 (see FIG. 3) of the bridge. For conventional microbridge flow type sensors, the thickness 162 of the bridge is on the order of 1 micron. To ruggedize such a sensor, it is contemplated that the thickness "d" 162 of the bridge may be increased to 15 microns or more. In a preferred embodiment, the thickness "d" 162 of the bridge may be increased to about 10 microns.

When the thickness "d" 162 of the bridge is increased, the sensitivity of the sensor decreases, the ruggedness increases, and the response time decreases. As indicated above, in many applications such as flight control applications, the response time of the sensor should remain relatively low, such as less than 10 milliseconds. Thus, it is clear that this thermal sensor is uniquely well suited to provide both the desired ruggedness and speed of response for such applications.

Figure 11:
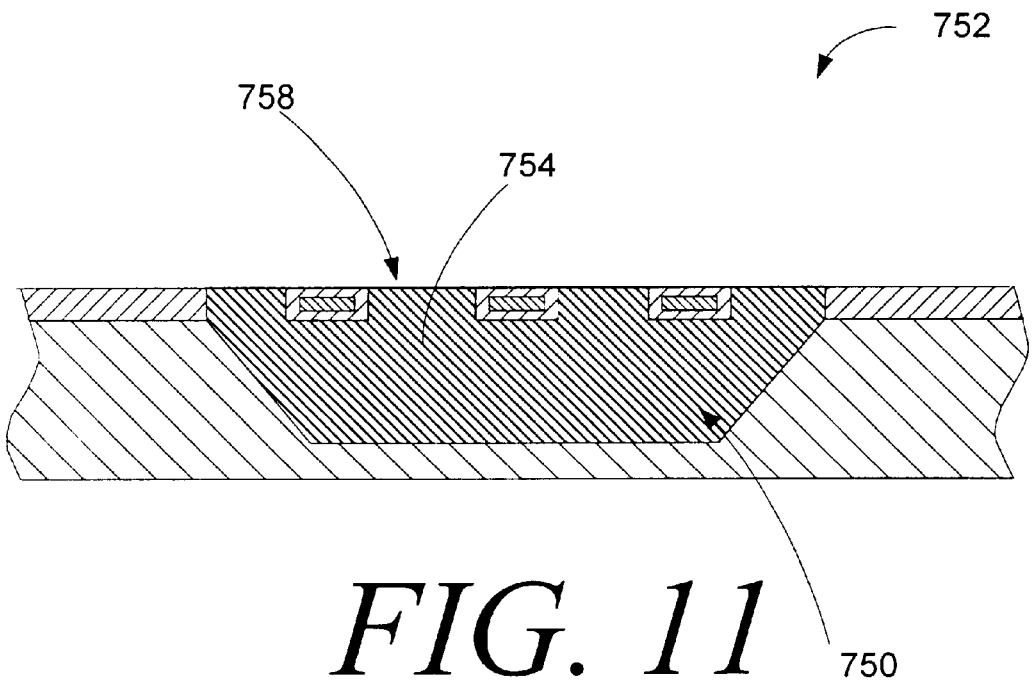
FIG. 11 is a schematic cross-sectional side view of a microbridge sensor of the present invention where the cavity under the bridge is filled with a filler.

Another approach for increasing the ruggedness and reducing the sensitivity of a bridge sensor is to at least partially fill the cavity 750 of a conventional microbridge flow sensor 752 with a filler 754. One such embodiment is shown in FIG. 11. The filler 754 preferably has a thermal coefficient of expansion that is substantially similar to the substrate material (e.g., silicon), and has a low coefficient of thermal conductivity. In one embodiment, the filler is a UV curable epoxy. It is contemplated that the filler may include a honeycomb, ribbed or embossed configuration, if desired.

When a filler 754 is provided in the cavity, the sensitivity of the sensor decreases, the ruggedness increases, and the response time increases. In many applications, the response time should remain relatively low, such as less than 20 milliseconds. Thus, there is a balance between the degree of sensitivity and ruggedness of the sensor versus the desired response time.

Figure 12:
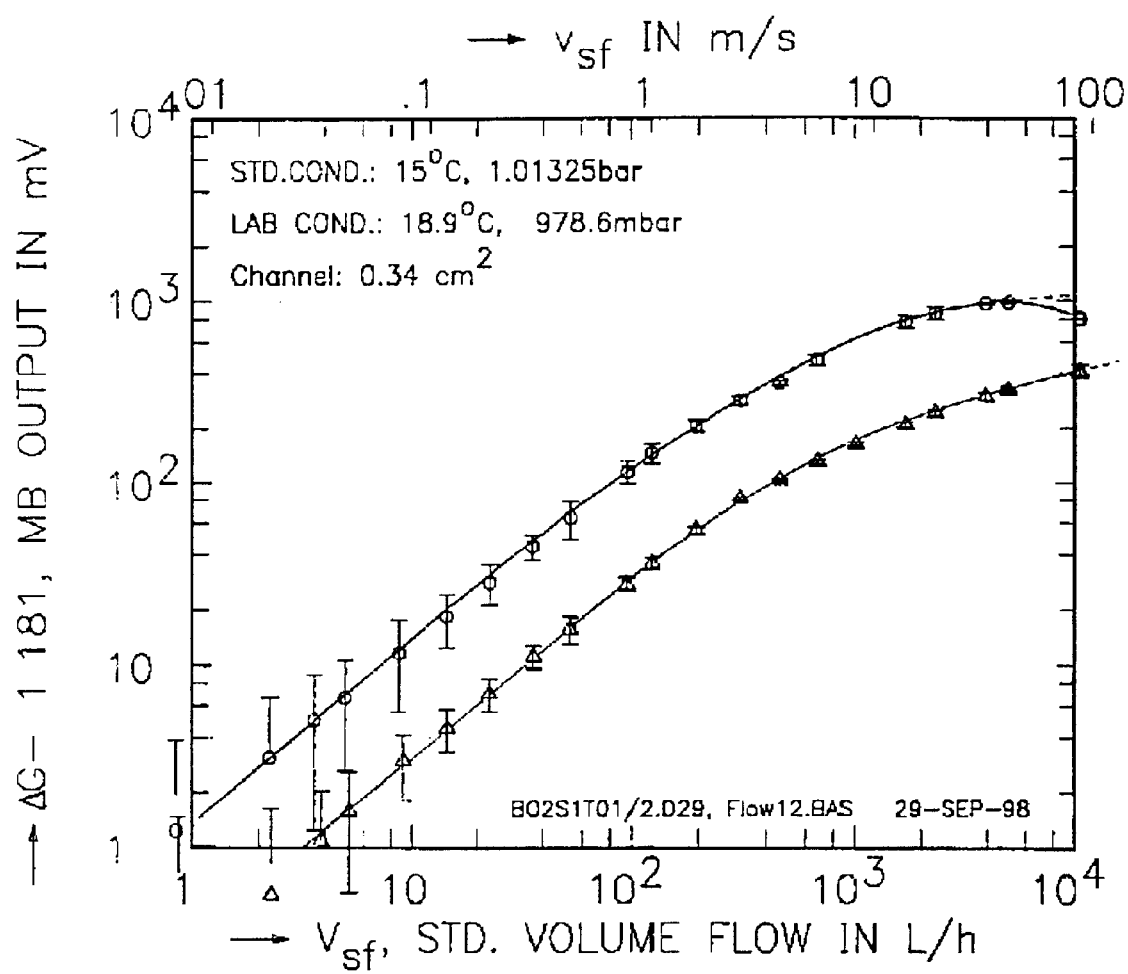
FIG. 12 shows a graph showing microbridge sensor outputs versus flow rate for two microbridge type flow sensors with and without an underfill of epoxy.

FIG. 12 shows a graph showing microbridge sensor outputs versus flow rate for two microbridge type flow sensors with and without an underfill of epoxy. Curve 400 was obtained using a standard microbridge flow sensor. Curve 402 was obtained using a microbridge flow sensor with an epoxy underfill. In both cases, the heater temperature rise was set to about 30° C. The graph shows that the epoxy underfill decreases the signal output by about a factor of 4x, thus shifting the output curve toward higher flows. This also tends to reduce the overall noise levels by more than 4x. In the example shown, the S/N ratio is improved by about 20% for comparable flows.

Figure 13:
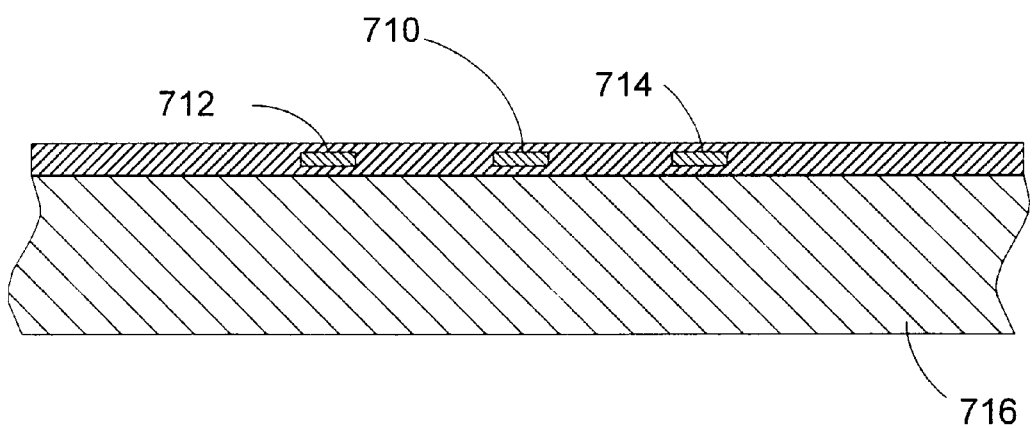
FIG. 13 is a schematic cross-sectional side view of a Microbrick™ sensor of the present invention where the heater and sensor elements are formed directly on a substrate.

FIG. 13 shows yet another approach for improving the ruggedness and reducing the sensitivity of a sensor assembly. In this approach, the heater 710 and the sensor elements 712 and 714 are formed directly on a substrate 716 such as silicon, Pyrex glass, ceramic, or any other suitable substrate. This configuration is referred to herein as a Microbrick™ type flow sensor. The Microbrick™ type flow sensor eliminates the cavity and bridge of a conventional microbridge type sensor. Because the air-stream does not flow around both sides of the heater and sensor elements, the sensitivity is reduced. Because the backsides of both the heater 710 and sensor elements 712 and 714 are supported by the substrate, the sensor is more rugged than a conventional microbridge type sensor. In any of the above-embodiments, it is contemplated that a protective layer (not shown) may be deposited on the top surface of the heater and sensor elements to farther help reduce the sensitivity and increase the ruggedness of the sensor.

Figure 14:
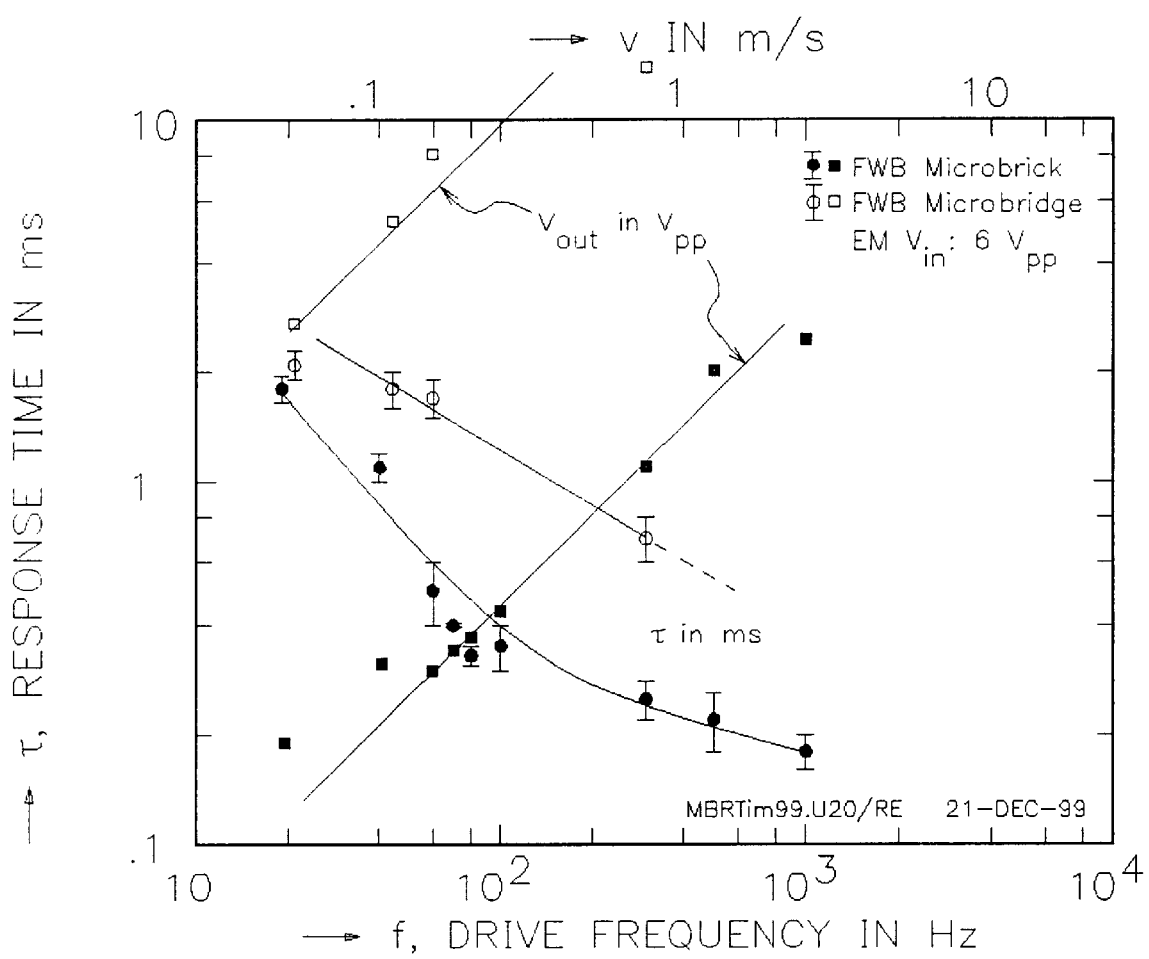
FIG. 14 is a graph showing experimental response times for a microbridge and Microbrick™ sensor assembly.

FIG. 14 is a graph showing illustrative response times for a microbridge and Microbrick™ sensor assembly. As can be seen, the response times for both the microbridge and Microbrick™ type flow sensors decrease with air speed, with the air speed shown on the top axis. The response time for the Microbrick™ type flow sensor is less than for the microbridge type flow sensor, but both have fast response times even at relatively low flow rates.

Figure 15A:
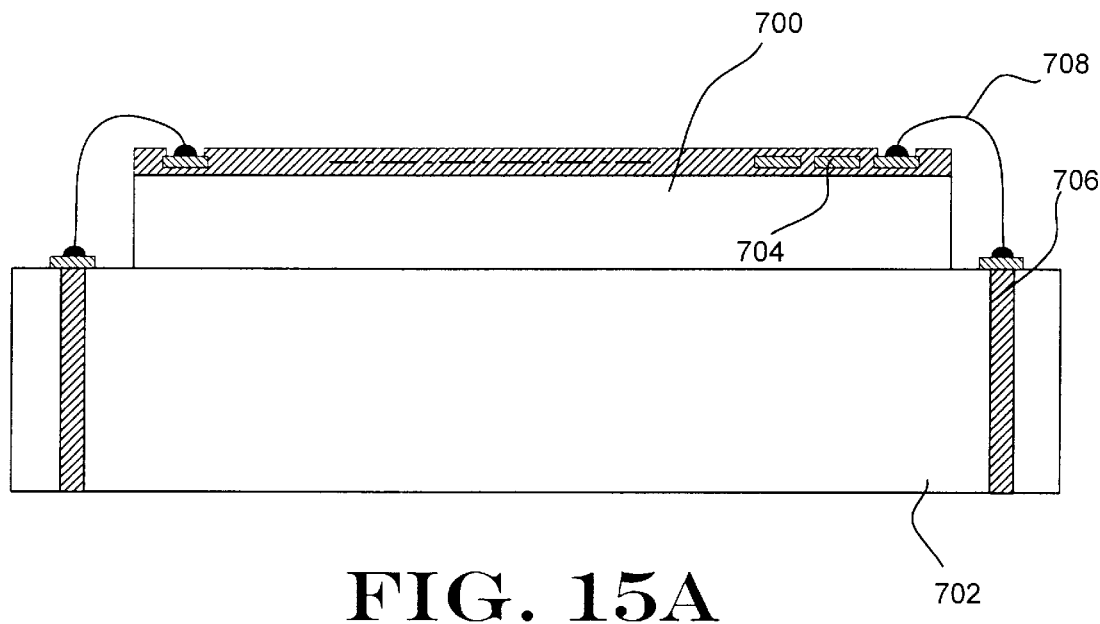
FIG. 15A is a schematic cross-sectional side view of a sensor assembly that uses gold bonding wires to connect the sensor chip to a header.

To further increase the ruggedness of the sensor assembly, it is contemplated that the gold bonding wires typically used to wire bond the I/O pads of the microbridge or Microbric™ type flow sensors to off-chip components or packages may be replaced with through-the-wafer (TTW) contacts. FIG. 15A is a schematic cross-sectional side view of a sensor assembly that uses gold bonding wires to connect the sensor chip to a header. A flow sensor is shown at 700, which is mounted to a header 702. A hole is cut through the top of the silicon nitride layer of the sensor to reach the heater or sensor element 704. Likewise, the header 702 may have a contact post 706 extending therethrough, as shown. To connect the contact post 706 to the heater or sensor element 704, a gold bonding wire 708 may be solder bonded to the heater or sensor element 704 and the contact post 706 using a solder bonding process. A limitation of this approach is that the gold bonding wires 708 can be relatively fragile, particular in harsh environments. Vibration, shock, contaminates, and other factors may all contribute to the fatigue of the gold bonding wires.

Figure 15B:
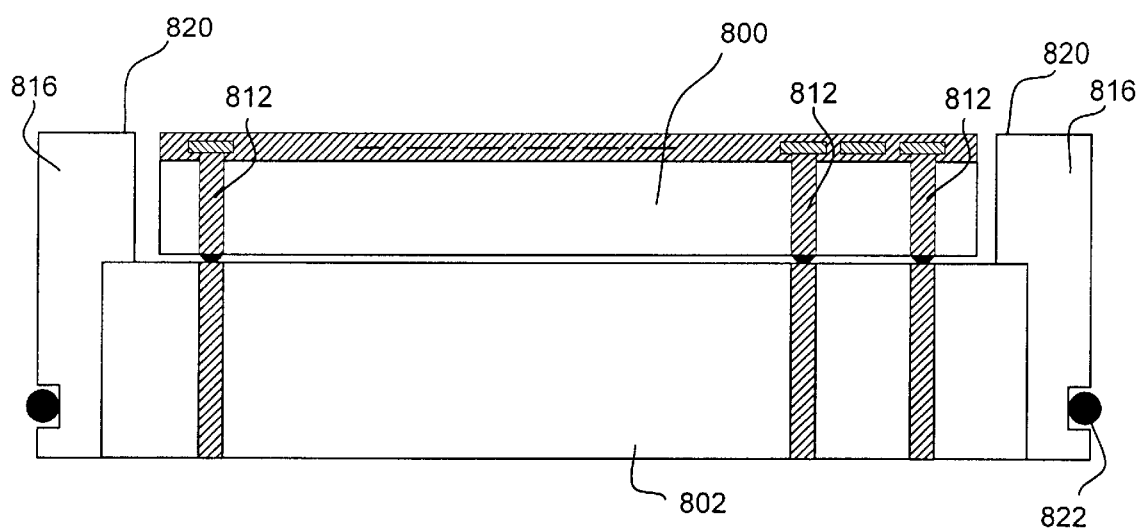
FIG. 15B is a schematic cross-sectional side view of a sensor assembly that uses through-the-wafer (TTW) contacts to connect the sensor chip to the header.

An improved approach is shown in FIG. 15B. In this approach, a flow sensor is shown at 800, which is mounted to a header 802. Rather than using gold bonding wires, this embodiment uses through-the-wafer (TTW) contacts 812. Through-the-wafer (TTW) contacts are contacts that extends through the substrate 814 of the sensor chip. To connect the through-the-wafer (TTW) contacts 812 to the header 802, solder bumps or the like may be provided. The solder bumps are preferably in registry with the through-the-wafer (TTW) contacts 812 and the contact posts 706, as shown. This provides a highly reliable connection between the sensor assemblies and off-chip components. Also, through-the-wafer (TTW) contacts 812 may make it more convenient to connect to sensor elements that are away from the edge of the sensor chip. A further discussion of through-the-wafer (TTW) contacts can be found in co-pending U.S. patent application Ser. No. 09/207,165, which are incorporated herein by reference.

It is contemplated that header 802 may include side walls 816, as shown. The side walls 816 preferably extend up along the sides of the sensor chip 800 so that the top surfaces 820 of the side walls 816 are in substantial alignment with the top surface of the sensor chip 800. This may provide significant protection to the sensor chip 800.

In some applications, the sensor 800 is exposed to harsh environments. In such applications, the header 802 may be used as a conduit or barrier between the harsh environment of the sensor and a less harsh environment on the other side of the header 802. In the illustrative embodiment shown in FIG. 15B, the header 802 includes an o-ring seal 822 that is adapted to seal against an inside wall of a lumen (not shown). In this configuration, the header 802 may provide a barrier between the harsh environment of the sensor and the less harsh environment on the other side of the header 802, while still providing the sensor signals through the header.

Having thus described the preferred embodiments of the present invention, those of skill in the art will readily appreciate that the teachings found herein may be applied to yet other embodiments within the scope of the claims hereto attached.

What is claimed is:

1. A sensor assembly for detecting the angular direction of an incoming fluid stream having a velocity, the sensor assembly comprising:

a first sensor having a first sensor axis for providing an output signal that is related to the component of the velocity of the incoming fluid stream that extends along the first sensor axis;

a second sensor having a second sensor axis for providing an output signal that is related to the component of the velocity of the incoming fluid stream that extends along the second sensor axis;

the first sensor and the second sensor positioned such that the first sensor axis intersects the second sensor axis at a point; and determining means for determining the angular direction of the incoming fluid stream from the output signal of the first sensor and the output signal of the second sensor.

2. A sensor assembly according to claim 1, wherein the determining means further determines the velocity of the incoming fluid stream from the output signal of the first sensor and the output signal of the second sensor.

3. A sensor assembly according to claim 1, wherein the first sensor axis and the second sensor axis intersect at an angle of about 90 degrees.

4. A sensor assembly according to claim 3, wherein the determining means determines the velocity of the incoming fluid stream from the output signal of the first sensor and the output signal of the second sensor using the relation:

$$v = \left[ \frac{(\Delta G_A^{2/n} + \Delta G_B^{2/n})}{2} \right]^{n/2}$$

where, $\Delta G_A$=the first sensor output signal;

$\Delta G_B$=the second sensor output signal; and n=curve fit factor.

5. A sensor assembly according to claim 4, where n is about equal to 1.

6. A sensor assembly according to claim 4, wherein the determining means determines the angular direction of the incoming fluid stream from the output signal of the first sensor and the output signal of the second sensor using the relation:

$$\varphi = \frac{A-B}{2}$$

where, $$A = \arccos\left[\left(\frac{\Delta G_A}{v}\right)^{1/n}\right];$$

B=90−A; and v=the velocity of the incoming fluid stream.

7. A sensor assembly according to claim 1, wherein the angular direction of the incoming fluid stream is related to the flight attitude of an aircraft by mounting the sensor assembly along a vertical plane.

8. A sensor assembly according to claim 2, wherein the velocity of the incoming fluid stream is related to the air speed of an aircraft.

9. A sensor assembly according to claim 1, wherein the first sensor axis and the second sensor axis intersect at an angle of less than 90 degrees.

10. A sensor assembly according to claim 9, wherein the first sensor axis and the second sensor axis intersect at an angle of 90-X degrees, where X is greater than zero.

11. A sensor assembly according to claim 9, where the determining means determines the velocity of the incoming fluid stream from the output signal of the first sensor and the output signal of the second sensor using the relation:

$$v = \{\Delta G_A^2 + \Delta G_B^2 - 1.5 \Delta G_A \Delta G_B \cos(90 + X)\}^{n/2}.$$

12. A sensor assembly for detecting the angular direction of an incoming fluid stream having a velocity, the sensor comprising:

a first microbridge flow sensor having at least one elongated heater strip and at least one elongated sensor strip both in thermal communication with the incoming fluid stream, the at least one elongated sensor strip laterally spaced from the at least one elongated heater strip, both the at least one elongated heater strip and the at least one elongated sensor strip extending at least substantially perpendicular to a first sensor axis, the first microbridge flow sensor providing an output signal that is related to the component of the velocity of the incoming fluid stream that extends along the first sensor axis;

a second microbridge flow sensor having at least one elongated heater strip and at least one elongated sensor strip both in thermal communication with the incoming fluid stream, the at least one elongated sensor strip laterally spaced from the at least one elongated heater strip, both the at least one elongated heater strip and the at least one elongated sensor strip extending at least substantially perpendicular to a second sensor axis, the second microbridge flow sensor providing an output signal that is related to the component of the velocity of the incoming fluid stream that extends along the second sensor axis;

the first microbridge flow sensor and the second microbridge flow sensor positioned such that the first sensor axis intersects the second sensor axis at a point; and determining means for determining the angular direction of the incoming fluid stream from the output signal of the first microbridge flow sensor and the output signal of the second microbridge flow sensor.

13. A sensor assembly according to claim 12, wherein the determining means further determines the velocity of the incoming fluid stream from the output signal of the first microbridge flow sensor and the output signal of the second microbridge flow sensor.

14. A sensor assembly according to claim 13, wherein the first sensor axis and the second sensor axis intersect at an angle of about 90 degrees.

15. A sensor assembly according to claim 14, wherein the determining means determines the velocity of the incoming fluid stream from the output signal of the first microbridge flow sensor and the output signal of the second microbridge flow sensor using the relation:

$$v = \left[\frac{(\Delta G_A^{2/n} + \Delta G_B^{2/n})}{2}\right]^{n/2}$$

where, $\Delta G_A$=the first microbridge flow sensor output signal;

$\Delta G_B$=the second microbridge flow sensor output signal; and n=scaling factor.

16. A sensor assembly according to claim 15, where n=2.

17. A sensor assembly according to claim 16, wherein the determining means determines the angular direction of the incoming fluid stream from the output signal of the first microbridge flow sensor and the output signal of the second microbridge flow sensor using the relation:

$$\varphi = \frac{A - B}{2}$$

where, $$A = \arccos\left[\left(\frac{\Delta G_A}{v}\right)^{1/n}\right]; \text{ and}$$

B=90−A.

18. A sensor assembly according to claim 13, wherein the first sensor axis and the second sensor axis intersect at an angle of less than 90 degrees.

19. A sensor assembly according to claim 18, wherein the first sensor axis and the second sensor axis intersect at an angle of 90-X degrees, where X is greater than zero.

20. A sensor assembly according to claim 19, where the determining means determines the velocity of the incoming fluid stream from the output signal of the first sensor and the output signal of the second sensor using the relation:

$$v = \{\Delta G_A^2 + \Delta G_B^2 - 1.5 \Delta G_A \Delta G_B \cos(90 + X)\}^{n/2}.$$

21. A sensor assembly according to claim 12, wherein the first microbridge flow sensor includes a heater means connected to each of the at least one elongated heater strip for providing a transient elevated temperature condition in each of the at least one elongated heater strips.

22. A sensor assembly according to claim 21, wherein the at least two elongated sensor strips of the first microbridge flow sensor have a resistance that changes with temperature.

23. A sensor assembly according to claim 22, wherein the first microbridge flow sensor further comprises:

time lag means for determining at least two time lag values each corresponding to the delay between a transient elevated temperature condition in a selected elongated heater strip and the resulting transient elevated temperature condition in at least two corresponding elongated sensor strips; and determining means for determining the component, $\Delta G_A$, of the velocity of the incoming fluid stream that extends along the first sensor axis using the at least two time lag values.

24. A sensor assembly according to claim 23, wherein the second microbridge flow sensor includes a heater means connected to each of the at least one elongated heater strips for providing a transient elevated temperature condition in each of the at least one elongated heater strips.

25. A sensor assembly according to claim 24, wherein the at least two elongated sensor strips of the second microbridge flow sensor have a resistance that changes with temperature.

26. A sensor assembly according to claim 25, wherein the second microbridge flow sensor further comprises:

time lag means for determining at least two time lag values each corresponding to the delay between a transient elevated temperature condition in a selected elongated heater strip and the resulting transient elevated temperature condition in at least two corresponding elongated sensor strips; and determining means for determining the component, $\Delta G_B$, of the velocity of the incoming fluid stream that extends along the second sensor axis using the at least two time lag values.

27. A sensor assembly according to claim 12, wherein the first microbridge sensor has a substrate and a bridge, the bridge carrying the at least one elongated heater strip and the at least one elongated sensor strip, the substrate having a cavity formed therein below the bridge to separate the bridge from the substrate.

28. A sensor assembly according to claim 27, wherein the bridge is at least partially thermally isolated from the substrate.

29. A sensor assembly according to claim 28, wherein the bridge has a thickness that is in the range of 1 to 15 microns.

30. A sensor assembly according to claim 27, wherein the cavity is at least substantially filled with a filler.

31. A sensor assembly according to claim 30, wherein the filler has a substantially similar thermal coefficient of expansion as the substrate.

32. A sensor assembly according to claim 30, wherein the filler is a poor thermal conductor.

33. A sensor assembly according to claim 30, wherein the filler is a UV curable epoxy.

34. A sensor assembly according to claim 30, wherein the filler is in a honeycomb configuration.

35. A sensor assembly according to claim 30, wherein the filler is in a ribbed or embossed configuration.

36. A sensor assembly according to claim 30, wherein the sensor and heater strips are deposited on a solid substrate of a low thermal conductivity material such as glass.

37. A sensor assembly according to claim 12, wherein the first microbridge sensor has a protective coating over the at least one elongated heater strip and at least one elongated sensor strip.

38. A sensor assembly according to claim 12, wherein contact is made to the at least one elongated heater strip and at least one elongated sensor strip of the first microbridge sensor via through-the-wafer (TTW) contacts.

39. A sensor assembly according to claim 38, wherein the through-the-wafer (TTW) contacts mate with corresponding mating contact posts on a header.

40. A sensor assembly according to claim 39, wherein the header includes a seal.

41. A sensor assembly according to claim 12, wherein contact is made to the at least one elongated heater strip and at least one elongated sensor strip of the first microbridge sensor via wire bonds.

42. A sensor according to claim 12, wherein the fluid is a gas.

43. A sensor according to claim 12, wherein the fluid is air.

44. A method for detecting the angular direction of an incoming fluid stream having a velocity, the method comprising the steps of:

measuring a first component of the velocity of the incoming fluid stream that extends along a first axis;

measuring a second component of the velocity of the incoming fluid stream that extends along a second axis;

the first axis intersecting the second axis at a point; and determining the angular direction of the incoming fluid stream from the first component and the second component of the velocity of the incoming fluid stream.

45. A method according to claim 44, further comprising the step of determining the velocity of the incoming fluid stream.

46. A method according to claim 45, wherein the first axis and the second axis intersect at an angle of about 90 degrees.

47. A method according to claim 46, wherein the velocity of the incoming fluid stream is determined using the relation:

$$v = \left[ \frac{(\Delta G_A^{2/n} + \Delta G_B^{2/n})}{2} \right]^{n/2}$$

where, $\Delta G_A$=the first thermal microanemometer output signal;

$\Delta G_B$=the second thermal microanemometer output signal; and n=curve fit factor.

48. A method according to claim 46, where n is about equal to 1.

49. A method according to claim 46, wherein the angular direction of the incoming fluid stream is determined using the relation:

$$\psi = A - B/2$$

where, $$A = \arccos\left[\left(\frac{\Delta G_A}{v}\right)^{1/n}\right];$$

$$B = 90 - A;$$

and v=the velocity of the incoming fluid stream.

50. A method according to claim 44, wherein the first sensor axis and the second sensor axis intersect at an angle of less than 90 degrees.

51. A method according to claim 49, wherein the first sensor axis and the second sensor axis intersect at an angle of 90−X degrees, where X is greater than zero.

52. A method according to claim 50, where the determining means determines the velocity of the incoming fluid stream from the output signal of the first sensor and the output signal of the second sensor using the relation:

$$v = \{\Delta G_A^2 + \Delta G_B^2 - 1.5 \Delta G_A \Delta G_B \cos(90+X)\}^{n/2}.$$

* * * * *